(12) United States Patent
Dewachter (10) Patent No.: US 8,729,199 B2
(45) Date of Patent: May 20, 2014

(54) METHOD FOR NEUTRALIZING POLYMERIZATION CATALYST

(75) Inventor: Daan Dewachter, Mechelen (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 22 days.

(21) Appl. No.: 13/514,355

(22) PCT Filed: Dec. 17, 2010

(86) PCT No.: PCT/EP2010/070032
§ 371 (c)(1),
(2), (4) Date: Jun. 7, 2012

(87) PCT Pub. No.: WO2011/073373
PCT Pub. Date: Jun. 23, 2011

(65) Prior Publication Data
US 2012/0271012 A1    Oct. 25, 2012

(30) Foreign Application Priority Data

Dec. 18, 2009   (EP) .................................... 09179829

(51) Int. Cl.
*C08F 2/12* (2006.01)
*C08F 2/00* (2006.01)
*B08B 9/032* (2006.01)
*C08F 110/02* (2006.01)

(52) U.S. Cl.
USPC ....... 526/64; 526/919; 134/22.12; 134/22.15; 134/22.18; 34/381

(58) Field of Classification Search
USPC .................. 526/64, 919; 528/484; 134/22.12, 134/22.18, 22.15; 502/111; 34/381
See application file for complete search history.

(56) References Cited

U.S. PATENT DOCUMENTS

| | | | | |
|---|---|---|---|---|
| 3,073,809 A * | 1/1963 | Kluiber et al. | ................. | 526/157 |
| 3,152,106 A * | 10/1964 | Mostert | .......................... | 526/159 |
| 4,859,249 A * | 8/1989 | Valentini | .................... | 134/22.18 |
| 5,021,381 A * | 6/1991 | Burroway et al. | ............ | 502/117 |
| 5,371,053 A | 12/1994 | Agapiou et al. | | |
| 7,906,597 B2 * | 3/2011 | Fouarge | .......................... | 526/64 |
| 2003/0114608 A1 * | 6/2003 | Tharappel et al. | .............. | 526/64 |
| 2008/0039596 A1 | 2/2008 | Fouarge | | |

FOREIGN PATENT DOCUMENTS

| | | |
|---|---|---|
| EP | 0471497 A1 | 2/1992 |
| EP | 1 316 566 A2 | 6/2003 |
| WO | 94/26792 A1 | 11/1994 |
| WO | 03/016362 A1 | 2/2003 |
| WO | 03016362 A1 | 2/2003 |
| WO | 2005/077522 A1 | 8/2005 |

OTHER PUBLICATIONS

Microfluidics M-110EH-30 Microfluidizer Processor Product Brochure, 2008, 3 Pages.*
European Office Action issued in European Application No. 10798775.2-1301 dated Jun. 6, 2013 (6 pages).

* cited by examiner

*Primary Examiner* — Fred M Teskin (57) ABSTRACT

The present invention relates to a process for cleaning a catalyst slurry preparation system and/or a catalyst preparation system. More particularly, the invention relates to a cleaning process for a catalyst preparation system and/or for a catalyst slurry preparation system, wherein an aqueous catalyst inactivation agent is used to rinse the systems, or any parts thereof. The catalysts used in the present invention may be chromium, Ziegler-Natta or metallocene catalysts.

16 Claims, 3 Drawing Sheets

METHOD FOR NEUTRALIZING POLYMERIZATION CATALYST

CROSS-REFERENCE TO RELATED APPLICATIONS

This application claims the benefit of PCT/EP2010/070032, filed Dec. 17, 2010, which claims priority from EP 09179829.8, filed Dec. 18, 2009.

TECHNICAL FIELD OF THE INVENTION

The present invention relates to a process for cleaning a catalyst slurry preparation system and/or a catalyst preparation system. More particularly, the invention relates to a cleaning process for catalyst preparation system and/or a catalyst slurry preparation system, wherein a suitable amount of an aqueous catalyst inactivation agent is used to rinse said systems, or any parts thereof. The catalysts used in the present invention may be chromium, Ziegler-Natta or metallocene catalysts.

BACKGROUND OF THE INVENTION

Polyethylene (PE) is synthesized by polymerizing ethylene ($CH_2=CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed therefrom, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene, comprise chromium catalysts, Ziegler-Natta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

It is known in the art that for the production of ethylene polymers having suitable properties it is important during polymerization to control reaction conditions, including reaction temperatures, reactant concentration, etc. Polymerization reactions are also sensitive to the quantity, quality and the type of catalyst utilized.

As different polyethylene reactions require different types of catalysts, the system that is used for the preparation and the supply of catalyst slurry to a polymerization reaction often treats consecutively different catalysts. When switching between catalysts the catalyst preparation and supply system may require a cleaning step to remove and deactivate remaining traces of the previous catalyst. In case impurities remain in the preparation system, these will most certainly affect the subsequent polymerization reaction.

In view of the above, there remains a need in the art for a thorough and safe cleaning method for the system that is used for the preparation and the supply of catalyst slurry to a polymerization reactor.

SUMMARY OF THE INVENTION

The present invention provides a thorough and safe method for cleaning a catalyst slurry preparation system and/or for cleaning a catalyst preparation system which overcomes at least some of the above-mentioned problems. The present invention provides cleaning methods which are based on the use of an aqueous catalyst inactivation agent containing water.

In a first aspect, the present invention relates to a method for cleaning a catalyst slurry preparation system for the preparation and the supply of catalyst slurry to an ethylene polymerization reactor, wherein the system, or parts thereof, are rinsed with an aqueous catalyst inactivation agent. More in particular, the present invention relates to a method for cleaning a catalyst slurry preparation system, said catalyst slurry preparation system comprising at least one or more mud pot(s) operably connected to a mixing vessel by means of one or more conduits characterized in that the method comprises at least one step of rinsing said catalyst slurry preparation system, or one or more parts thereof, with an aqueous catalyst inactivation agent. Preferably, the present invention relates to a method for cleaning a catalyst slurry preparation system, said catalyst slurry preparation system comprising at least one or more mud pot(s) operably connected to a mixing vessel by means of one or more conduits characterized in that the method comprises at least one step of rinsing said catalyst slurry preparation system, or one or more parts thereof, with an aqueous catalyst inactivation agent, wherein said aqueous catalyst inactivation agent is injected into said catalyst slurry preparation system at a pressure comprised between 100 and 2000 bar.

In a preferred embodiment, the invention provides a method wherein said aqueous catalyst inactivation agent comprises at least 30% by weight of water. In another embodiment, the invention provides a method wherein said aqueous catalyst inactivation agent comprises water and an alcohol. In another embodiment, the invention provides a method wherein said aqueous catalyst inactivation agent is in a liquid or gaseous phase.

In another embodiment, the present invention also relates to a method for supplying catalyst slurry to an ethylene polymerization loop reactor, said catalyst slurry consisting of solid catalyst and a liquid hydrocarbon diluent, comprising the steps of:
 (a) preparing catalyst slurry in a catalyst slurry preparation system, said catalyst slurry preparation system comprising at least one or more mud pot(s) operably connected to a mixing vessel by means of one or more conduits, by the steps of:
  (a1) preparing concentrated catalyst slurry in said one or more mud pot(s);
  (a2) transferring said concentrated catalyst slurry from said mud pot(s) to said mixing vessel through said one or more conduits; and
  (a3) diluting said concentrated catalyst slurry in a suitable amount of said diluent in said mixing vessel thereby obtaining a diluted catalyst slurry having a concentration suitable for use in an ethylene polymerization reaction; and
 (b) transferring said diluted catalyst slurry from said mixing vessel (3) to said ethylene polymerization loop reactor;
characterized in that preceding to step (a) said catalyst slurry preparation system, or one or more parts thereof, are cleaned according to a method as described herein.

According to another aspect, the present invention relates to the use of an aqueous catalyst inactivation agent comprising at least 30% water in a catalyst slurry preparation system, adapted for the preparation of catalyst slurry and the supply of said catalyst slurry to a polymerization reactor. Preferably, the present invention relates to the use of an aqueous catalyst inactivation agent comprising at least 30% water in a catalyst slurry preparation system, adapted for the preparation of catalyst slurry and the supply of said catalyst slurry to a polymerization reactor, wherein said aqueous catalyst inactivation agent is injected into said catalyst slurry preparation system at a pressure comprised between 100 and 2000 bar.

According to another aspect, the present invention relates to the use of an aqueous catalyst inactivation agent comprising at least 30% water in a catalyst preparation system, adapted for the preparation of metallocene catalyst, Ziegler-Natta catalyst or chromium catalyst.

In accordance with the invention, rinsing of a catalyst slurry preparation system, or one or more parts thereof, with an aqueous catalyst inactivation agent as described herein, once the system has been emptied and the catalyst slurry has been supplied into the ethylene polymerization reactor, enables the inactivation and removal of essentially all remaining catalyst traces from the catalyst slurry preparation system.

The use of a catalyst inactivation agent as defined herein for that purpose is unconventional in the art, especially, since it is generally accepted that the use of aqueous solutions for that purpose should be avoided. In fact it is known that such solutions may affect either the stability of the preparation system and/or the quality of the subsequently prepared catalyst slurry. Nevertheless, unexpectedly in accordance with the present invention catalyst slurry batches that are prepared in a catalyst slurry preparation system that has been cleaned in accordance with the invention still show a high quality with no significant loss of catalyst activity. Moreover, applying a method according to the present invention was not shown to have substantial negative effects on the stability and operability of the catalyst slurry preparation system.

These and further aspects and embodiments of the invention are hereunder further explained in the following sections and in the claims, and illustrated by non-limiting figures.

BRIEF DESCRIPTION OF THE FIGURES

The constructional details of valves, pumps etc. have been omitted in the figures for clarity, it being within the skill of the art to supply these.

DETAILED DESCRIPTION OF THE INVENTION

Before the present method and devices used in the invention are described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may be used in the practice or testing of the present invention, the preferred methods and materials are now described.

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of". The recitation of numerical ranges by endpoints includes all numbers and fractions subsumed within the respective ranges, as well as the recited endpoints. The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed. All documents cited in the present specification are hereby incorporated by reference in their entirety.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Catalyst is introduced into an ethylene polymerization reactor under the form of a catalyst slurry prepared in a catalyst slurry preparation system. As the catalyst slurry preparation system often treats consecutively different catalysts, cleaning of the system is required to remove and deactivate remaining traces of the previous catalyst. Especially since remaining impurities will most certainly negatively affect the polymerization reaction. The present invention thereto provides a method for cleaning a catalyst slurry preparation system for the preparation and the supply of catalyst slurry to an ethylene polymerization reactor, wherein the system, or parts thereof, are rinsed with an aqueous catalyst inactivation agent, preferably containing water.

As used in the present invention, the term "catalyst slurry" refers to a composition comprising catalyst solid particles and a diluent. The solid particles can be suspended in the diluent, either spontaneously or by homogenization techniques, such as mixing. The solid particles can be inhomogeneously distributed in a diluent and form a sediment or deposit. In the present invention it is especially applicable to solid particles of ethylene polymerization catalyst in a liquid diluent. These slurries will be referred to herein as ethylene polymerization catalyst slurries.

By the term "solid particles" it is meant a solid provided as a collection of particles, such as for instance a powder or granulate. In the present invention it is especially applicable to a catalyst provided on a carrier or support. The support is preferably a silica (Si) support.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts. In the present invention it is especially applicable to ethylene polymerization catalysts such as metallocene catalysts, chromium catalysts and/or Ziegler-Natta catalysts. Whereas a "catalyst slurry" refers herein to a composition comprising catalyst solid particles and a diluent, "catalyst" refers herein to the catalyst molecules either as such or provided on a carrier or support.

Catalyst slurry according to the invention consists or consists essentially of solid catalyst, such as those given above, and a liquid hydrocarbon diluent. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

In an embodiment, the present invention is directed to the cleaning of a catalyst preparation system. The term "catalyst preparation system" refers to device or system wherein catalyst particles, such as metallocene, chromium or Ziegler Natta catalyst particles are prepared.

In another embodiment, the present invention is directed to the cleaning of a catalyst slurry preparation system. As used herein the term "catalyst slurry preparation system" refers to a device or system wherein catalyst slurry as defined herein is prepared Said catalyst preparation system in connected to a polymerization loop reactor for supply of the prepared catalyst slurry to the reactor. In an exemplary embodiment, the catalyst slurry preparation system comprises one or more mud pots containing catalyst slurry, one or more conduits connecting the mud pot(s) to a mixing vessel for transferring catalyst slurry from the mud pot(s) to the mixing vessel, at least one mixing vessel wherein catalyst slurry is diluted to a concentration suitable for use in a polymerization reaction, and one or more conduits connecting the mixing vessel to a polymerization reactor for transferring the diluted catalyst slurry to the polymerization reactor. The latter conduits may be provided with pumping means for pumping the catalyst slurry from the mixing vessel to a polymerization reactor.

Figure 1:
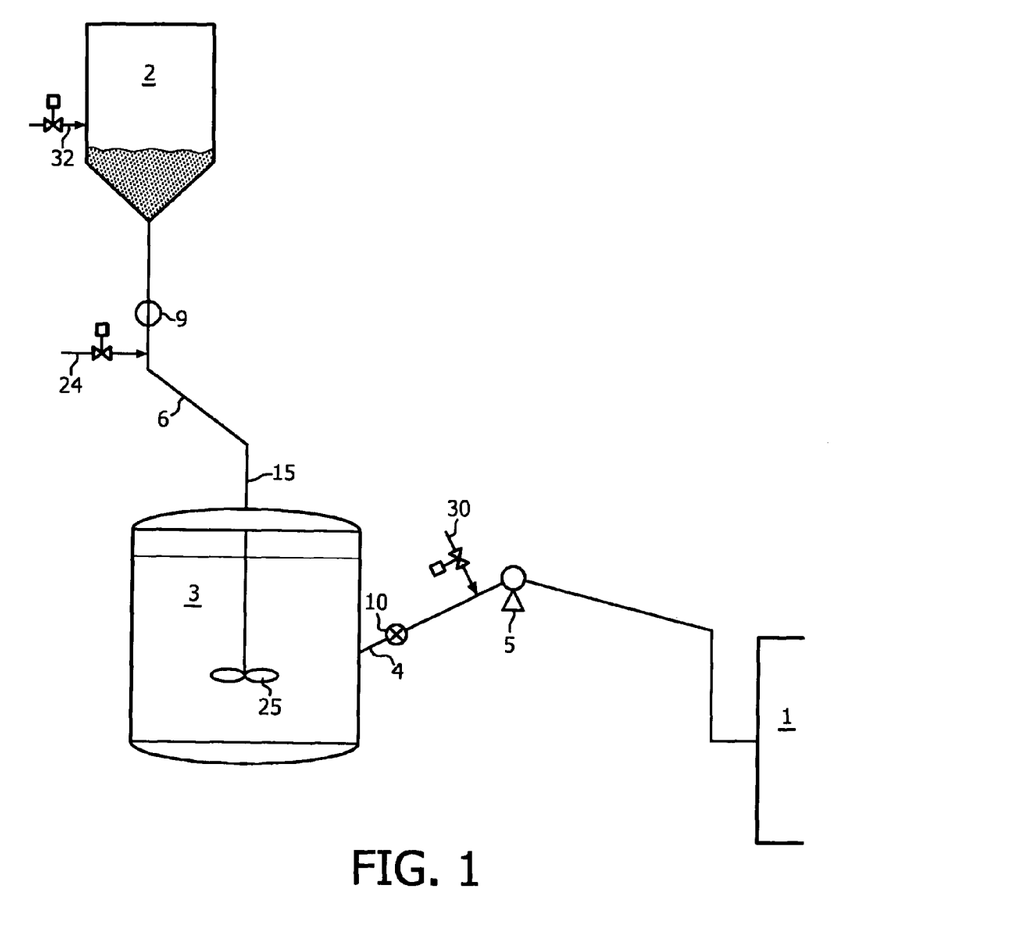
FIG. 1 schematically illustrates an embodiment of a catalyst slurry preparation system for preparing and feeding catalyst slurry to an ethylene polymerization reactor.
Figure 2:
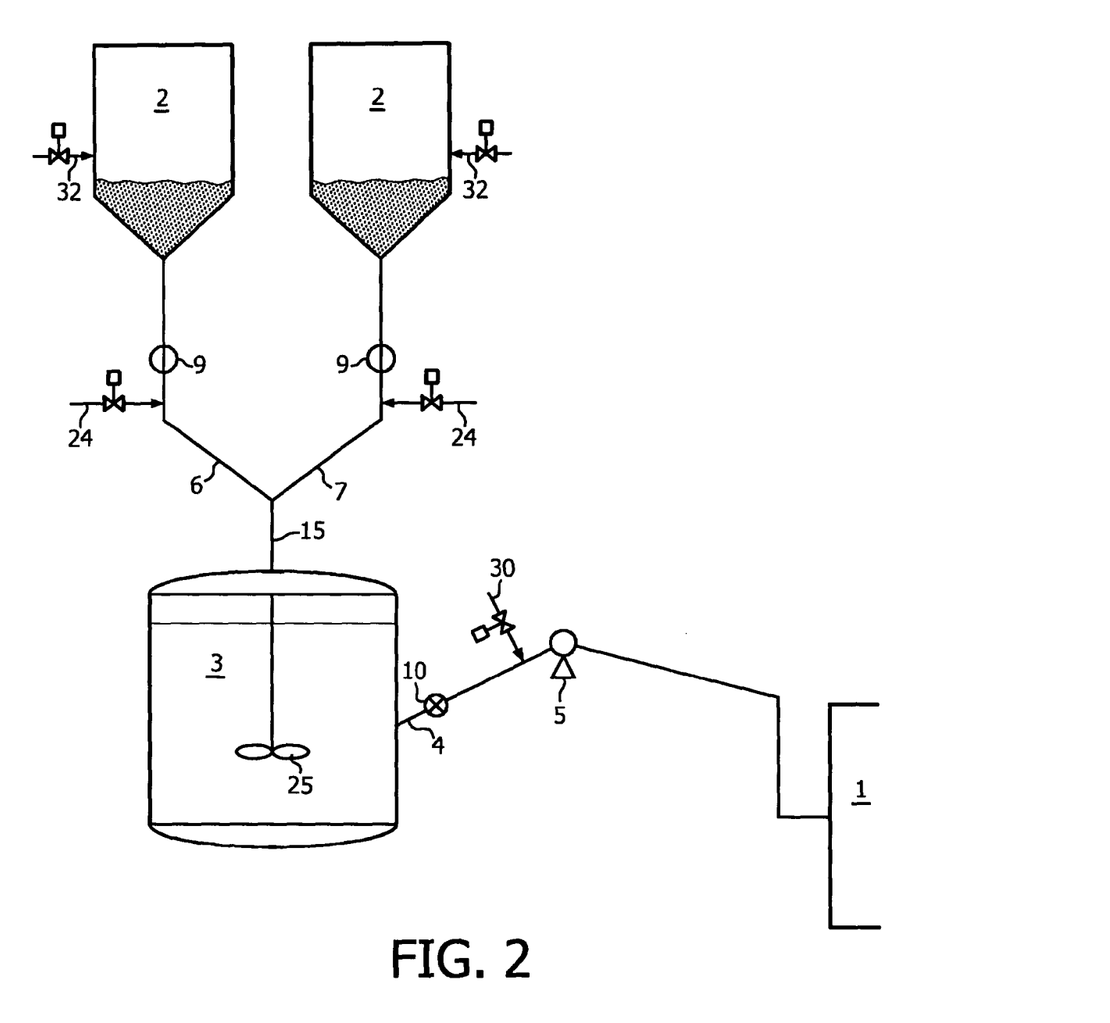
FIG. 2 schematically illustrates another embodiment of a catalyst slurry preparation system for preparing and feeding catalyst slurry to an ethylene polymerization reactor.
Figure 3:
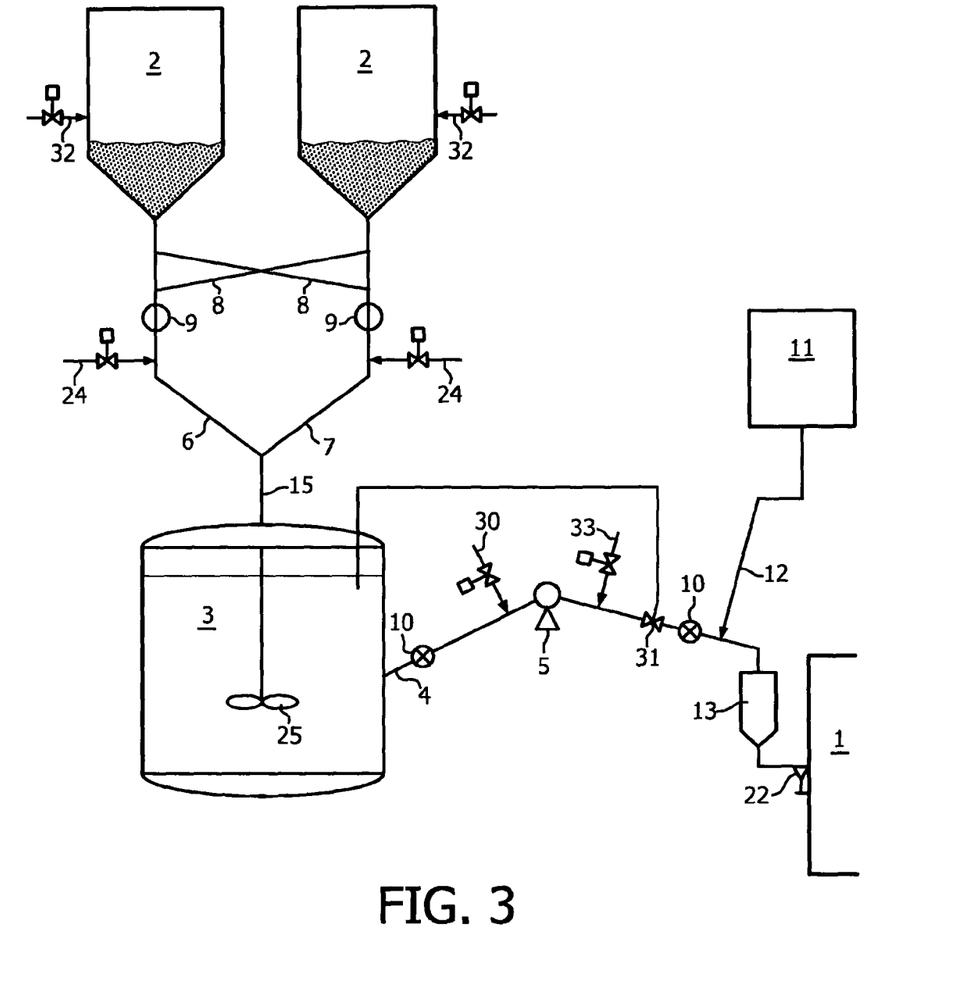
FIG. 3 schematically illustrates another embodiment of a catalyst preparation system for preparing and feeding catalyst slurry to an ethylene polymerization reactor.

Non-limiting examples of catalyst slurry preparation systems according to the present invention are for instance illustrated in FIGS. 1, 2 and 3.

According to FIG. 1 a catalyst slurry preparation system comprises a mud pot 2 wherein concentrated catalyst slurry is prepared. Catalyst slurry can be prepared by providing dry catalyst from a catalyst supply vessel (not shown) to said mud pot and by adding a suitable amount of diluent to the mud pot through an injection valve 32. Once prepared the concentrated catalyst slurry is transported through conduits 6 and 15 to a mixing vessel 3, wherein the catalyst slurry is diluted to a concentration suitable for use in a polymerization reaction. Conduit 6 may be provided with a catalyst slurry feeder 9 for dosing the feed of catalyst slurry to the mixing vessel 3 and an injection valve 24 for the injection of diluent. The mixing vessel 3 is provided with mixing means 25. In addition, the system further comprises a conduit 4 which connects the mixing vessel 3 to a polymerization reactor 1. The conduit 4 may be provided with flushing means 30, a pump means 5 such as a pump and flow measuring means 10, such as e.g. a coriolis meter. The diluted catalyst slurry is pumped through this conduit 4 from said mixing vessel 3 to the reactor 1.

FIG. 2 represents a catalyst slurry preparation system comprising two mud pots 2 containing concentrated catalyst slurry. Both mud pots are provided with an injection valve 32 for the addition of diluent into the mud pots 2. Conduits 6, 7 and 15 connect the mud pots 2 with a mixing vessel 3, wherein the catalyst slurry is diluted to a concentration suitable for use in a polymerization reaction. Conduit 6 and 7 may be provided with catalyst slurry feeders 9 for dosing the feed of catalyst slurry from the mud pots 2 to the mixing vessel 3 and injection valves 24 for the injection of diluent. The mixing vessel 3 is provided with mixing means 25. The diluted slurry is then pumped through conduit 4 in a polymerization reactor 1. To that end the conduit 4 which connects the mixing vessel 3 to a reactor 1 is provided with pumping means 5. The conduit 4 may be further provided with diluent flushing means 30 and flow measuring means 10, such as e.g. a coriolis flow meter.

According to FIG. 3 a catalyst slurry preparation system is provided which two mud pots 2 containing concentrated catalyst slurry, and both provided with an injection valve 32 for addition of diluent into the mud pots 2. Conduits 6, 7 and 15 connect the mud pots 2 with a mixing vessel 3, wherein diluted catalyst slurry is stored. In the case illustrated in FIG. 2 wherein two mud pots 2 are provided, each having a conduit 6 or 7, the conduit 6 for transferring said catalyst slurry from a first storage vessel 2 to a mixing vessel 3 is interchangeable with a second conduit 7 for transferring said catalyst slurry from a second mud pot 2 to a mixing vessel 3 through lines 8 connecting said first 6 with said second 7 conduit. Such interconnection 8 permits, in case of interruption of transfer through one conduit 6, to discharge the catalyst slurry to the mixing vessel 3 through a second conduit 7. Conduit 6 and 7 may be provided with catalyst slurry feeders 9 for dosing the feed of catalyst slurry from the mud pots 2 to the mixing vessel 3. The conduits 6, 7 are further provided with injection valves 24 for the injection of diluent. The mixing vessel 3 is provided with mixing means 25. The conduit 4, as illustrated on FIG. 3, is further provided with safety valves and diluent flushing means 30, 33, either at the inlet, at the outlet or at both sides of the pumps 5 as illustrated on FIG. 3. Diluent flushing means 30, 33 enable to flush diluent such as isobutane through the conduit 4 and to keep the conduit 4 and the pumping means 5 unplugged. In addition, the conduit 4 is further provided with flow measuring means 10 for easily measuring the catalyst flow rate in the conduit 4. These flow measuring means 10 preferably are Coriolis flow meters that can be provided upstream and downstream from said pumps 5. Conduit 4 may be further provided with a conduit and valve 31 for by-passing the pump 5. The conduits 4 for transferring catalyst slurry into to the reactor may also be equipped by one or more valves, preferably piston valves 22. The piston valves 22 are capable of sealing the orifice by which the conduit 4 is connected to the reactor 1.

A catalyst slurry preparation system according to the invention may further comprise a feeding system for an activating agent as illustrated on FIG. 3. As used herein the term "activating agent" refers to materials that can be used in conjunction with a catalyst in order to improve the activity of the catalyst during the polymerization reaction. Catalyst activating agents are well known in the art and will therefore not be discussed into detail herein. As illustrated on FIG. 3, a feeding system for an activating agent may comprise a storage vessel 11 for storing said activating agent and a conduit 12 intersecting the conduit 4. Conduit 4 may also comprise a contact vessel 13. Said vessels 13 have a diameter with is considerably larger than the diameter of the conduits 4, for improving mixing of the catalyst and the activating agent before supply to the reactor 1.

It should be noted that the catalysts referred to in the present invention in their pure or diluted form are highly reactive upon contact with water. The high reactivity of the catalysts results either in a highly reactive reaction upon contact with water or the fast and irreversible inactivation of the catalyst. As the catalyst slurry preparation system according to the present invention refers to a system wherein the pure form of the catalyst, or a dilution thereof, is handled, care should be taken when cleaning such installation. In view hereof, upon considering the cleaning of the catalyst slurry preparation system a water-based or aqueous solution would not be considered. Moreover, depending on the used catalyst, other problems may arise. For instance, metal based catalysts such as metallocenes are highly water reactive substances which spontaneously undergo a chemical reaction upon contact with water, and therefore cleaning steps with an aqueous solution provide risks. Other catalysts such as Ziegler-Natta and chromium catalysts are less reactive, however, these types of catalysts remain reactive upon contact with water, thereby inactivating these catalysts. This has a considerable negative effect on the quality of the subsequent polymerization reaction. In case traces of such inactivated catalysts remain in the catalyst slurry preparation system and are supplied to an ethylene polymerization reactor, the polymerization reaction may have decreased efficiency and yield polymer resins of less quality and of undesired properties.

Despite these teachings, an efficient process has been established for cleaning a catalyst slurry preparation system based on the use of an aqueous catalyst inactivation agent. As used herein the term "catalyst inactivation agent" refers to compositions for the inactivation or deactivation of a catalyst, that latter being preferably a metallocene, Ziegler-Natta or chromium catalyst. These compositions are collectively termed herein as catalyst inactivation agents and also provide the opportunity to remove any traces of catalyst remaining in the catalyst preparation system. The terms deactivating or inactivating refer to the action of eliminating the catalytic activity of the catalyst. The use of the catalyst inactivation agent in the method of the present invention further provides the opportunity to remove any traces of catalyst remaining in the catalyst preparation system. The catalyst inactivation agent according to the present invention is preferably an "aqueous" catalyst inactivation agent, whereby "aqueous" refers to the fact that the inactivation agent (composition) contains at least 10% by weight of water. In an embodiment, the invention provides a method wherein said aqueous catalyst inactivation agent consists of water.

Rinsing as disclosed herein at least one or more parts of a catalyst slurry preparation system enables to deactivate catalyst remaining in the catalyst slurry preparation system, leaving no significant amounts of impurities in the catalyst slurry preparation system. Accordingly, the activity of a prepared catalyst is improved when a rinsing step with an aqueous catalyst inactivation agent occurs between the preparation of two catalyst slurry batches.

In an embodiment, the method according to the present invention provides that said aqueous catalyst inactivation agent comprises at least 10% by weight of water, preferably said aqueous catalyst inactivation agent comprises at least 20%, 30%, 40%, 50%, 60%, 70%, 80% or 90% by weight of water. As the amount of water in said aqueous catalyst inactivation agent increases, the rate at which catalyst is deactivated increases. Higher amounts of water in said aqueous catalyst inactivation agent therefore provide higher catalyst deactivation rates. On the other hand, an aqueous catalyst inactivation agent with a small amount of water provides very high rates by which the aqueous catalyst inactivation agent as such can be removed from the catalyst slurry preparation system, without leaving significant traces of said aqueous catalyst inactivation agent. In accordance with the invention the amount of water in said aqueous catalyst inactivation agent preferably ranges between 10% and 100%, preferably between 25% and 75%, and more preferably between 45% and 55% by weight of the composition. Such compositions provide a good equilibrium between a fast removal of the aqueous catalyst inactivation agent and a fast deactivation of the catalyst present in the catalyst slurry preparation system. Said aqueous catalyst inactivation agent is particularly suitable for inactivating metallocene and Ziegler-Natta catalysts.

In another embodiment said aqueous catalyst inactivation agent comprises an anti-freezing agent such as an alcohol. Said alcohol refers to an organic compound in which a hydroxyl group is bound to a carbon atom of an alkyl or substituted alkyl group such as for instance, but not limited to methanol, ethanol, propanol, butanol, isopropanol and/or tert-butyl alcohol. The addition of an alcohol to said aqueous catalyst inactivation agent permits to lower the freezing temperature of the agent, allowing the agent to remain in a liquid form under low temperature conditions. The aqueous catalyst inactivation agent will therefore not freeze at temperatures below 0° C., allowing the preparation system to remain operational at extremely low temperatures.

In a preferred embodiment, said aqueous catalyst inactivation agent comprises at least 10% by weight of alcohol, preferably at least 20%, 30%, 40%, 50%, 60%, 70%, 80% or 90% by weight of alcohol. In a preferred embodiment, the alcohol is isopropanol. In an example, said aqueous catalyst inactivation agent is a mixture of 50 wt % isopropanol and 50 wt % water. In another example, said aqueous catalyst inactivation agent is a mixture of 90 wt % water and no more than 10 wt % isopropanol.

In another preferred embodiment, said catalyst inactivation agent is oxygen. Oxygen is particularly suitable for inactivating a chromium catalyst.

In another preferred embodiment, said catalyst inactivation agent is carbon monoxide (CO). Carbon monoxide is particularly suitable for inactivating metallocene and Ziegler-Natta catalysts.

In a preferred embodiment, said catalyst inactivation agent is selected from a list consisting of water, carbon monoxide and oxygen.

Furthermore, according to another embodiment, the invention provides a method wherein said aqueous catalyst inactivation agent is injected into said catalyst slurry preparation system at a pressure comprised between 1 and 2000 bar, and preferably between 3 and 200 bar, more preferably between 100 and 2000 bar, and more preferably between 200 and 1000 bar.

By injecting said aqueous catalyst inactivation agent into said catalyst slurry preparation system at high pressures, the catalyst slurry preparation system, or one or more parts thereof, are rinsed with the aqueous catalyst inactivation agent at a very high pressure, providing an improved removal of the impurities from the catalyst slurry preparation system as well as increasing the catalyst deactivation efficiency. Also, the high pressure provides an additional mechanical removal of impurities present in the catalyst slurry preparation system.

According to a further embodiment, the invention provides a method wherein said aqueous catalyst inactivation agent is injected into said catalyst slurry preparation system or one or more parts thereof in a liquid or gaseous phase. Whereas a liquid aqueous catalyst inactivation agent may provide a more economical cleaning process, the use of an aqueous catalyst inactivation agent in gaseous phase has been found to provide a more efficient deactivation of the catalyst, an improved removal of the impurities from catalyst slurry preparation system and an faster and more efficient removal from the aqueous catalyst inactivation agent itself from the catalyst slurry preparation system.

In another embodiment, the invention provides a method wherein after said rinsing step, said catalyst slurry preparation system, or one or more parts thereof, are dried with an inert gas. An inert gas refers to any gas with a low oxygen content and which is not reactive with the catalyst. Non-limiting examples of inert gasses which may be used in the method according to the present invention are helium, neon, argon, krypton, xenon, radon and/or nitrogen. Preferably, in a method according to the present invention, nitrogen is used as an inert gas. By providing a drying step after rinsing the catalyst slurry preparation system, or one or more parts thereof, with said aqueous catalyst inactivation agent, an additional step is provided that ensures the catalyst slurry preparation system to be essentially free of any traces of the aqueous catalyst inactivation agent. Whereas after rinsing the catalyst slurry preparation system with an aqueous catalyst inactivation agent, the catalyst slurry preparation system may be essentially free of the aqueous catalyst inactivation agent due to for instance the evaporation thereof, an additional step, where the catalyst slurry preparation system is dried with an inert gas such as nitrogen, provides an additional insurance for the user that no substantial impurities nor traces of the aqueous catalyst inactivation agent remain in the catalyst slurry preparation system.

According to another embodiment, the present invention relates to a method for supplying catalyst slurry to an ethylene polymerization loop reactor, said catalyst slurry consisting of solid catalyst and a liquid hydrocarbon diluent, comprising the steps of:

(a) preparing catalyst slurry in a catalyst slurry preparation system comprising at least one or more mud pot(s) operably connected to a mixing vessel by means of one or more conduits by the steps of
   (a1) preparing concentrated catalyst slurry in said one or more mud pot(s);
   (a2) transferring said concentrated catalyst slurry from said mud pot(s) to said mixing vessel through said one or more conduits; and
   (a3) diluting said concentrated catalyst slurry in a suitable amount of said diluent in said mixing vessel thereby obtaining a diluted catalyst slurry having a concentration suitable for use in an ethylene polymerization reaction; and (b) transferring said diluted catalyst slurry from said mixing vessel to said ethylene polymerization loop reactor.

The method is characterized in that preceding to step (a) said catalyst slurry preparation system, or one or more parts thereof, is cleaned according to a method as given herein.

The term "concentrated catalyst slurry" refers to a composition comprising catalyst solid particles that are in suspension whereby the concentration of catalyst is at least higher than 10% by weight. The term "diluted catalyst slurry" refers to a composition comprising catalyst solid particles that are in suspension, whereby the concentration of catalyst is lower than or equal to 10% by weight.

According to a specific embodiment the catalyst as used in any of the polymerization methods according to the present invention is a metallocene catalyst, a chromium catalyst or a Ziegler-Natta catalyst.

In a preferred embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

(Ar)2MQ2     (I); or

R"(Ar)2MQ2     (II)

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;
wherein M is a transition metal selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and
wherein R" is a divalent group or moiety bridging the two Ar groups and selected from the group consisting of a C$_1$-C$_{20}$ alkylene, a germanium, a silicon, a siloxane, an alkylphosphine and an amine, and wherein said R" is optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl) zirconium dichloride (Cp$_2$ZrCl$_2$), bis(cyclopentadienyl) titanium dichloride (Cp$_2$TiCl$_2$), bis(cyclopentadienyl) hafnium dichloride (Cp$_2$HfCl$_2$); bis(tetrahydroindenyl) zirconium dichloride, bis (indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

The metallocene catalysts generally are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

In another embodiment of the present invention, said catalyst is a chromium catalyst. The term "chromium catalysts" refers to catalysts obtained by deposition of chromium oxide on a support, e.g. a silica or aluminum support. Illustrative examples of chromium catalysts comprise but are not limited to CrSiO$_2$ or CrAl2O$_3$.

In another embodiment of the present invention, said catalyst is a Ziegler-Natta catalyst. The term "Ziegler-Natta catalyst" "refers to catalysts having a general formula MX$_n$, wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to TiCl$_3$, TiCl$_4$.

A method for cleaning a catalyst slurry preparation system and/or for cleaning a catalyst preparation system as provided herein is also particularly suitable to be integrated in an ethylene polymerization process, as it permits to provide substantially clean catalyst slurry to a polymerization reactor, and as such influences polymerization conditions, and the quality and the properties of the prepared polymers. Therefore, the invention relates in another aspect to a method for the polymerization of ethylene in an ethylene polymerization loop reactor, comprising the steps of:

preparing a catalyst slurry in a catalyst slurry preparation system, said catalyst slurry preparation system comprising at least one or more mud pot(s) operably connected to a mixing vessel by means of one or more conduits;

feeding ethylene monomer, a diluent, said catalyst slurry, optionally hydrogen, and optionally one or more co-monomer(s) to said ethylene polymerization loop reactor;

polymerizing one or more ethylene monomers to produce a polyethylene slurry comprising liquid diluent and solid polyethylene particles, and recovering polyethylene particles from the slurry by separating at least a majority of the diluent from the slurry.

characterized in that said catalyst slurry preparation system, or one or more parts thereof, is cleaned before preparing said catalyst slurry according to a method as described herein. In a preferred embodiment a method is provided wherein a catalyst slurry is prepared in a catalyst slurry preparation system as described herein. In another preferred embodiment a method is provided wherein said catalyst is a metallocene catalyst, chromium catalyst or Ziegler-Natta catalyst, as defined herein.

As used herein the term "ethylene polymerization reaction" refers to the polymerization reaction of ethylene which is performed by feeding to a reactor reactants including ethylene monomer, a diluent, a catalyst in the form of catalyst slurry, an activating agent, optionally a co-monomer, and optionally a terminating agent such as hydrogen. The polymerization reaction of ethylene may for instance be carried out in loop reactors. Suitable "ethylene polymerization" includes but is not limited to homo-polymerization of ethylene or the co-polymerization of ethylene and a higher 1-olefin co-monomer such as butene, 1-pentene, 1-hexene, 1-octene or 1-decene.

As used herein the term "co-monomer" refers to co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

Hydrocarbon diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

An ethylene polymerization reaction as described herein can be carried out in a single loop reactor or in a double loop reactor, wherein in the latter case bimodal polyethylene can be prepared. According to another embodiment the invention therefore provides a method wherein said ethylene polymerization loop reactor, as used in any of the methods according to the present invention, is a single loop reactor or a first reactor of a double loop reactor. A double loop reactor consists of a first and a second loop reactor which are serially connected.

According to another embodiment, the present invention relates to the use of an aqueous catalyst inactivation agent a defined above, and preferably at the concentrations as given herein, and more preferably comprising at least 30% water, in a catalyst slurry preparation system that is adapted for the preparation of catalyst slurry and the supply of said catalyst slurry to a polymerization reactor.

An aqueous catalyst inactivation agent according to the present invention may also be used for cleaning and/or rinsing a catalyst preparation system or one or more parts thereof. Therefore, in another embodiment, the present invention relates to the use of an aqueous catalyst inactivation agent a defined above and preferably comprising at least 30% water, in a catalyst preparation system that is adapted for the preparation of catalyst such as metallocene, Ziegler-Natta or chromium catalysts as given above. The preparation of catalysts, such as for instance metallocene, Ziegler-Natta or chromium catalysts, is a relatively complicated process which includes a variety of chemical process steps. The systems adapted for the preparation of these catalysts also require regular cleaning and for this an aqueous catalyst inactivation agent as described herein may also be used, preferably at the concentrations as given herein, and preferably comprising at least 30% water.

EXAMPLES

A polyethylene polymerization reaction with a metallocene catalyst was started and performed under conditions to produce a polyethylene resin with a minimal concentration of gels. These polyethylene gels are usually polyethylene resins with very high molecular weight and high density. The polyethylene gels are believed to be due to traces of chromium catalysts or Ziegler-Matta catalysts from previous polymerization reactions entering the reactor after initiation of the polymerization reaction.

In order to ensure that no chromium catalyst or Ziegler-Natta catalyst entered the reactor once the metallocene catalyst was loaded, the mudpots, and conduits of the mudpots to the reactor as well as the catalyst feeders were cleaned using water under high pressure, preferably at a pressure around 200 to 1000 bar (high pressure cleaner). Using this cleaning procedure allowed the production of polyethylene resin with a minimal concentration of gels.

The invention claimed is:

1. A method for cleaning a catalyst slurry preparation system, said catalyst slurry preparation system comprising one or more mud pots operably connected to a mixing vessel by means of one or more conduits characterized in that the method comprises at least one step of rinsing said catalyst slurry preparation system, or one or more parts thereof, with an aqueous catalyst inactivation agent, wherein said aqueous catalyst inactivation agent is injected into said catalyst slurry preparation system at a pressure between 100 and 2000 bar.

2. The method according to claim 1, wherein after said rinsing step, said catalyst slurry preparation system is dried with an inert gas.

3. The method according to claim 1, wherein said aqueous catalyst inactivation agent comprises at least 30% by weight of water.

4. The method according to claim 1, wherein said aqueous catalyst inactivation agent comprises water and an alcohol.

5. The method according to claim 1, wherein said aqueous catalyst inactivation agent is in a liquid or gaseous phase.

6. A method for supplying catalyst slurry to an ethylene polymerization loop reactor, said catalyst slurry consisting of solid catalyst and a liquid hydrocarbon diluent, comprising the steps of:
    (a) preparing catalyst slurry in a catalyst slurry preparation system, said catalyst slurry preparation system comprising at least one or more mud pots operably connected to a mixing vessel by means of one or more conduits, by the steps of
        (a1) preparing concentrated catalyst slurry in said one or more mud pots;
        (a2) transferring said concentrated catalyst slurry from said mud pots to said mixing vessel through said one or more conduits; and (a3) diluting said concentrated catalyst slurry in a suitable amount of said diluent in said mixing vessel thereby obtaining a diluted catalyst slurry having a concentration suitable for use in an ethylene polymerization reaction; and (b) transferring said diluted catalyst slurry from said mixing vessel to said ethylene polymerization loop reactor;

characterized in that preceding to step (a) said catalyst slurry preparation system, or one or more parts thereof, is cleaned according to the method of claim 1.

7. The method according to claim 1, wherein said catalyst is a metallocene catalyst, Chromium catalyst or Ziegler-Natta catalyst.

8. A method for the polymerization of ethylene in an ethylene polymerization loop reactor, comprising the steps of:

preparing a catalyst slurry in a catalyst slurry preparation system, said catalyst slurry preparation system comprising at least one or more mud pots operably connected to a mixing vessel by means of one or more conduits;

feeding ethylene monomer, a diluent, said catalyst slurry, optionally hydrogen, and optionally one or more co-monomer(s) to said ethylene polymerization loop reactor;

polymerizing one or more ethylene monomers to produce a polyethylene slurry comprising liquid diluent and solid polyethylene particles, and recovering polyethylene particles from the slurry by separating at least a majority of the diluent from the slurry;

characterized in that said catalyst slurry preparation system, or one or more parts thereof, is cleaned before preparing said catalyst slurry according to the method of claim 1.

9. The method according to claim 8, wherein said ethylene polymerization loop reactor is a single loop reactor or a first reactor of a double loop reactor.

10. The method according to claim 1, wherein the aqueous catalyst inactivation agent is in a gaseous phase.

11. A method comprising:

injecting an aqueous catalyst inactivation agent at a pressure between 1 and 2000 bar into a catalyst slurry preparation system or a catalyst preparation system;

wherein the aqueous catalyst inactivation agent comprises at least 10% by weight water; and wherein the aqueous catalyst inactivation agent is injected into the catalyst slurry preparation system or the catalyst preparation system in a gaseous phase.

12. The method of claim 11, wherein the aqueous catalyst inactivation agent is injected into the catalyst slurry preparation system or the catalyst preparation system at a pressure ranging from 3 to 200 bar.

13. The method of claim 11, wherein the aqueous catalyst inactivation agent comprises water in an amount ranging between 25% to 75% by weight.

14. The method of claim 11, wherein the aqueous catalyst inactivation agent further comprises an alcohol.

15. A method comprising:

injecting an aqueous catalyst inactivation agent at a pressure between 1 and 2000 bar into a catalyst slurry preparation system or a catalyst preparation system;

wherein the aqueous catalyst inactivation agent comprises at least 10% by weight water; and drying the catalyst slurry preparation system or the catalyst preparation system with an inert gas after injecting the aqueous catalyst inactivation agent.

16. A method comprising:

injecting an aqueous catalyst inactivation agent at a pressure between 1 and 2000 bar into a catalyst slurry preparation system or a catalyst preparation system;

wherein the aqueous catalyst inactivation agent comprises at least 10% by weight water; and wherein the aqueous catalyst inactivation agent is injected into the catalyst slurry preparation system or the catalyst preparation system after the preparation of a first batch of catalyst slurry or catalyst within the catalyst slurry preparation system or the catalyst preparation system, and before the preparation of a second batch of catalyst slurry or catalyst within the catalyst slurry preparation system or the catalyst preparation system.

* * * * *